United States Patent [19]
O'Connor et al.

[11] 3,733,039
[45] May 15, 1973

[54] FEEL AUGMENTATION CONTROL SYSTEM FOR HELICOPTERS

[75] Inventors: Sean J. O'Connor, Monroe; Franklin A. Tefft, Killingworth, both of Conn.

[73] Assignee: United Aircraft Corporation, East Hartford, Conn.

[22] Filed: May 20, 1971

[21] Appl. No.: 146,572

[52] U.S. Cl............244/77 D, 244/17.13, 244/77 F, 244/83 D, 318/584, 318/585
[51] Int. Cl................................B64c 13/08
[58] Field of Search..................91/171, 189, 363 A, 91/438; 92/27, 84, 151; 244/77 R, 77 D, 77 F, 77 SE, 77 V, 76 A, 78, 83 D, 83 E, 17.13; 318/489, 584, 585

[56] References Cited

UNITED STATES PATENTS

| | | | |
|---|---|---|---|
| 3,584,814 | 6/1971 | Murphy | 244/77 D |
| 3,171,615 | 3/1965 | Patterson | 244/77 SE |
| 3,236,478 | 2/1966 | Adams et al. | 244/77 D UX |
| 3,485,463 | 12/1969 | Miller | 244/77 F X |
| 3,237,107 | 2/1966 | Bresenoff et al. | 244/77 D X |
| 3,438,306 | 4/1969 | Kazmarek | 244/77 R X |
| 3,411,410 | 11/1968 | Westbury et al. | 244/78 X |

Primary Examiner—Milton Buchler
Assistant Examiner—Stephen G. Kunin

[57] ABSTRACT

The handling capability of helicopters at high speed is enhanced by applying a force to the cyclic stick which is related to the resultant load factor induced on the helicopter by movement of the cyclic stick by the pilot. A feed augmentation system responds to craft pitch rate, cyclic stick deflection and cyclic stick deflection rate signals as a function of airspeed to provide a control force feel on the cyclic stick that does not vary with speed. Both pitch and roll axis controls can be provided.

7 Claims, 12 Drawing Figures

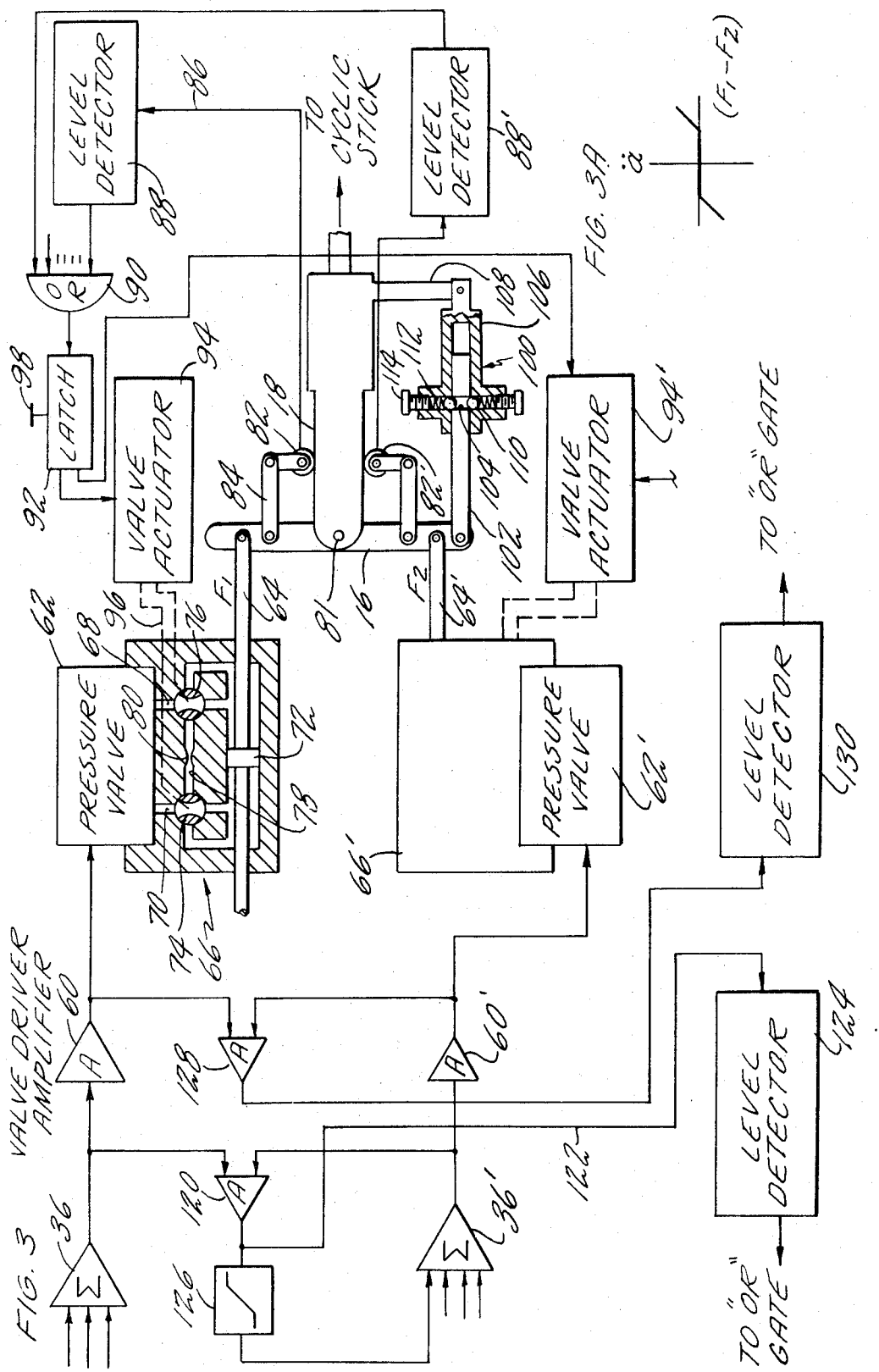

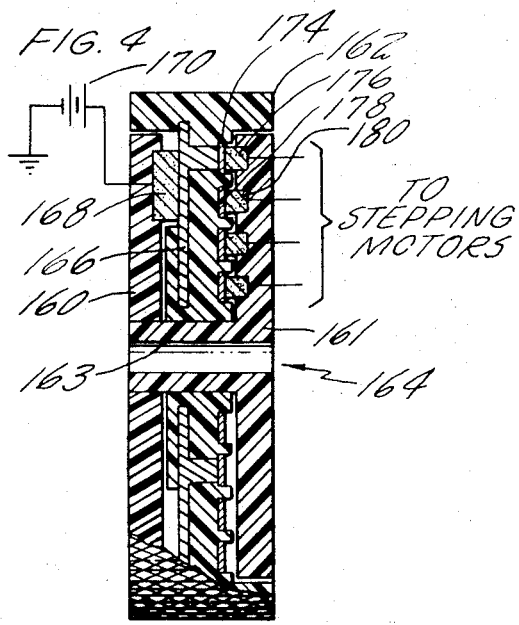
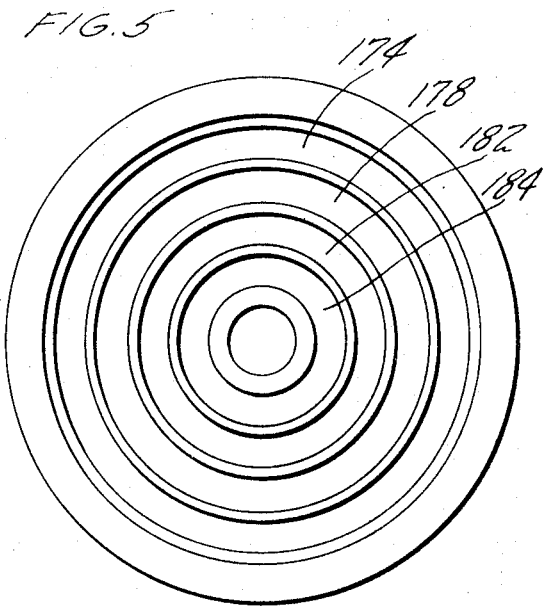
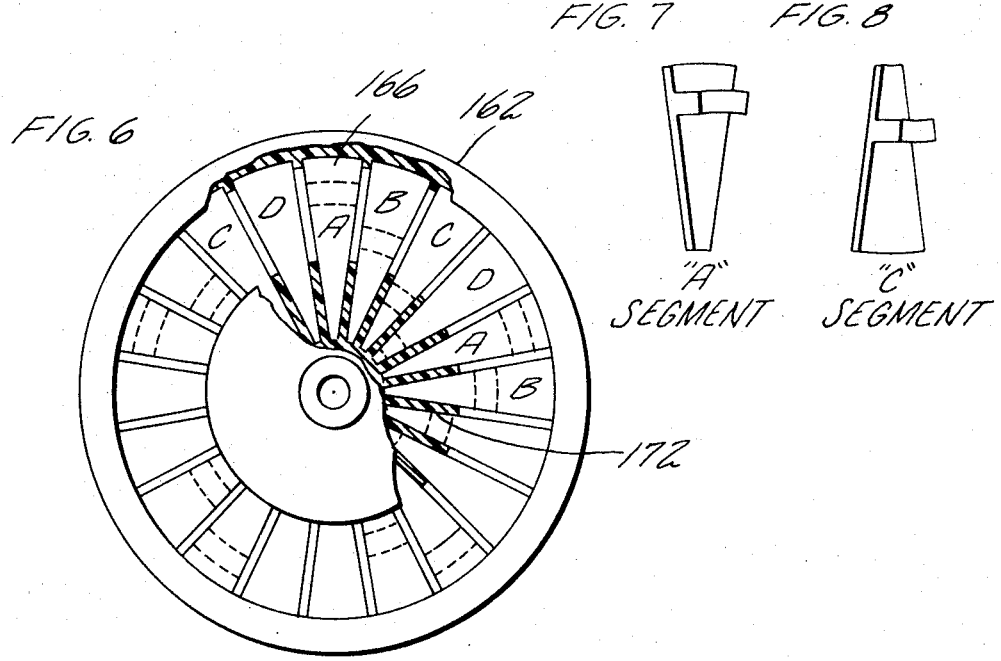

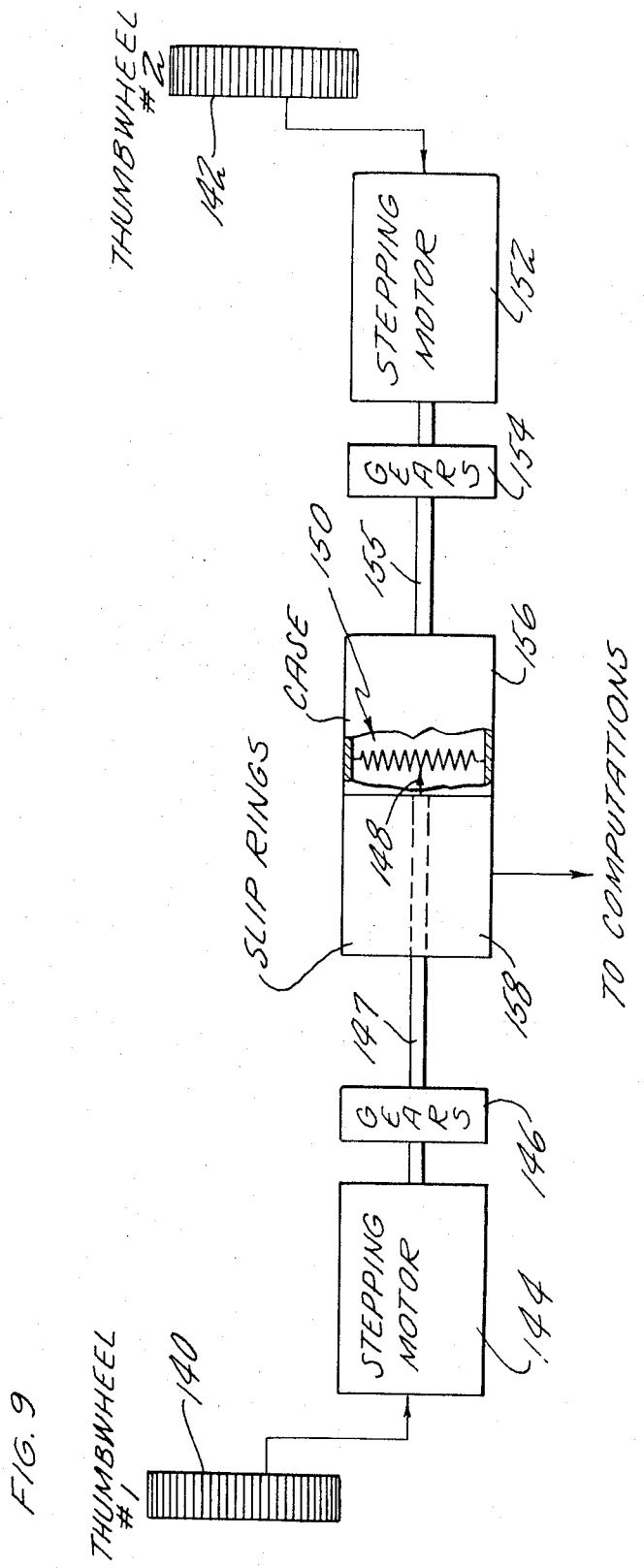

FEEL AUGMENTATION CONTROL SYSTEM FOR HELICOPTERS

BACKGROUND OF THE INVENTION

Field of the Invention

This invention relates to improved controls for aircraft, and in particular to a feel augmentation control for high speed helicopters. More specifically, this invention relates to a system which provides the pilot of a helicopter with a sensory input to enable him to correlate stick induced maneuvers of the helicopter to the helicopter's response.

Aircraft handling qualities are judged by the ease and precision with which a desired aircraft flight path can be achieved. To maneuver precisely, a pilot must be able to correlate his inputs with the aircraft's response. The pilot measures response by the load factor exerted on his body (the g-response). If stick inputs cannot be correlated with the resultant load factor, both in phase and in magnitude, precise maneuvering is difficult and handling qualities deteriorate. With the present generation of high speed helicopters, two problems inhibit the achievement of desirable handling qualities: first, there is an absence of stick forces that can be easily related to aircraft response; and second, the aerodynamic response to similar inputs increases rapidly with airspeed.

Currently, servo-boosted control systems do not yield a satisfactory input/response correlation, since no rotor head forces are felt on the input side of the servo. The pilot is left with only a displacement of the stick to compare with the load factor. Humans are not particularly adept at sensing small hand motions, so the correlation between stick input and aircraft reaction is minimal at best.

Present day automatic flight control systems employ mechanisms attached to the stick trim servos which exert breakout forces and spring forces on the pilot's hand. However, pilots often declutch the mechanisms and fly without any stick forces at all during maneuvers. The alternative risks pilot induced oscillations due to overcontrolling the aircraft after the breakout force has been overcome.

Changing sensitivity of the helicopter at different airspeeds requires the pilot to adjust the size of his inputs to produce the same response. Currently, in the absence of stick force cues, pilots use vibrations due to blade stall as cues to adapt inputs to changing aerodynamics. If vibrations are eliminated by an advance in the art, a miscalculated input at high speeds could seriously overstress the aircraft before the pilot is aware that this has occurred.

A solution has been found to the sensitivity of the helicopter to stick motions at high speed which also provides the pilot with a direct sensory "feel" of the response of the helicopter to the pilot induced inputs through the cyclic stick.

Description of the Prior Art

Control feel augmentation for servo-boosted control systems has been employed in fixed wing aircraft since World War II. Generally, one of two techniques is employed. The first is to attach a bob-weight on the pitch control that reacts to any normal acceleration. The second technique is to increase the spring constant of the trim spring for the control stick with advancing airspeed. Both techniques are inadequate for high performance helicopters. The bob-weight system does provide a force gradient (pounds per load factor) that does not vary with airspeed. However, fixed wing aircraft do not enjoy the advantages of a direct lift lever, the collective stick. Helicopters need not change the fuselage attitude in order to climb. Thus load factors can be induced in a helicopter with no cyclic stick input. This advantage obviates the utility of cyclic bob-weights, which cannot discern between load factors induced by cyclic inputs from load factors induced by collective inputs. Use of bob-weights thus leads to undesirable collective-to-cyclic control coupling. This effect is particularly troublesome in high speed flight where the load factor response to collective input increases, and during the large attitude changes when transitioning to and from a hover. Moreover, bob-weights exert objectionable forces during maneuvers involving more than 90° of bank.

Currently, most servo-boosted helicopters use trim springs to center the cyclic stick in hands off flight. Changing the spring gradient (pounds per inch of deflection) of the trim spring as airspeed changes can compensate for the changes in pitch control sensitivity. Moreover, collective stick inputs are not felt in the cyclic stick. However, the spring forces felt by the pilot do not correlate well with the resultant load factor during maneuvers. For example, in the rolling reversal maneuver where from a right level turn the aircraft is rolled smoothly to a left level turn, the pitch cyclic stick must momentarily pass forward of its trim point to prevent the air craft from gaining altitude as the aircraft rolls through wings level. With a stiff spring attached to the stick, an excessive pushing force must be exerted by the pilot, even though no negative load factor is induced. Similar instances of poor input/response correlation using Q-springs render this approach inadequate.

The present invention overcomes the problems encountered in the prior art feel augmentation systems and provides a novel and unique feel augmentation which has proven to enhance the high speed operation of helicopters.

SUMMARY OF THE INVENTION

The present invention provides a unique feel augmentation system for the helicopter cyclic stick for all airspeeds by measuring fuselage pitch rate, airspeed, stick deflection from trim and rate of stick movement, and summing these signals to provide an input to a feel actuating system which produces a force which opposes the deflection applied to the cyclic stick by the pilot. By properly combining the signals, the feel augmentation system implements a constant ratio of stick force to mean load factor in the pitch axis. Load factors induced by collective inputs are not translated to cyclic stick forces. A similar control system may be provided in the roll axis to provide a constant ratio of stick force to aircraft roll rate.

In addition, the present invention provides redundancy in the force actuating system, and fault detectors that sense differences in the electrical or mechanical portions of the duplicate systems are actuated to shutdown the feel augmentation system when discrepancies occur.

The present invention also provides a novel trim system as part of the feel augmentation system. The cyclic control may be trimmed to any desired position by thumbwheels located preferably in the pilot's compartment on the pilot's and copilot's cyclic sticks. The novel trim system allows both the pilot and copilot to trim the cyclic control independently, while still allowing full control by each.

Other novel features of the present invention and a preferred embodiment thereof will be described in conjunction with the accompanying figures.

BRIEF DESCRIPTION OF THE DRAWINGS

FIG. 3 shows schematically the details of the mechanical portion of FIG. 1, and shows in block diagram form the fault detection system.

FIG. 3A shows in graphic form the operation of the detent mechanism of FIG. 3.

FIG. 4 is a sectional view of the thumbwheel used in the trim system of FIG. 1.

FIG. 5 is a sectional view taken along the output side of the thumbwheel of FIG. 4.

FIG. 6 is a sectional view taken along the input side of the thumbwheel of FIG. 4.

FIGS. 7 and 8 show the segments A and C of FIGS. 4 and 6.

FIG. 9 is a schematic block diagram showing the details of the trim system of FIG. 1.

DESCRIPTION OF THE PREFERRED EMBODIMENT

The feel augmentation system described herein is applicable to any control element which produces an attitude or an altitude variation in a vehicle in response to movement of the control element. However, in describing a preferred embodiment it will be restricted to the cyclic stick of a helicopter, and specifically to attitude variations in the pitch channel of the helicopter caused by movement of the cyclic stick.

The feel augmentation system exerts forces on the pitch stick grip (cyclic stick) that are related to the load factor caused by pitch inputs. The ratio of exerted forces to induced load factor is held constant as airspeed changes. Thus the pilot is provided with desirable handling qualities that do not change with airspeed. That is, if the pilot exerts a 15 lbs. pull on the stick, he will achieve a 1-g load factor regardless of his airspeed. While the stick deflection required to induce a 1-g load factor diminishes as airspeed increases, the stick force required does not change, and at 200 knots the pilot commands a given aircraft response with the same force input used at 100 knots.

Figure 1:
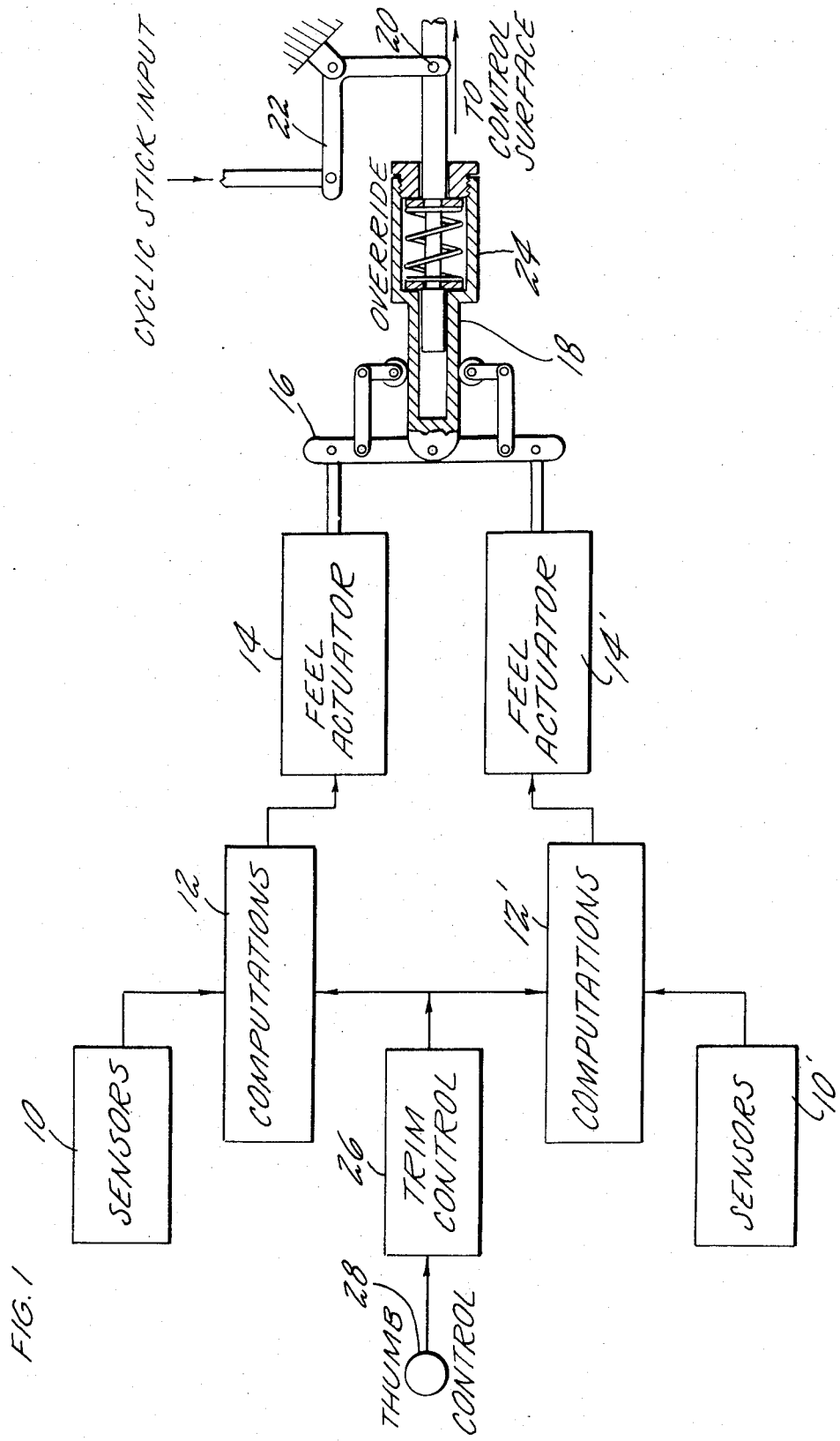
FIG. 1 is a schematic drawing in partial block diagram form showing the main features of the present invention.

The basic feel augmentation system is shown in FIG. 1. Redundant system responsive to craft inputs are utilized. Sensors 10 and 10' provide aircraft flight path measurements on which computations are performed in blocks 12 and 12'. As a result of the inputs from the sensors and the computations performed thereon, signals are fed to feel actuators 14 and 14' which cause a force to be exerted on yoke 16. Since the two feel actuators 14 and 14' are identical and respond to identical inputs, the forces applied to yoke 16 from feel actuators 14 and 14' should be identical, and should cause yoke 16 to move transversely and without any rotational component.

Control rod 18 is pivotally connected to the center of yoke 16 and is movable therewith. Connected also to control rod 18 at pivot point 20 is the cyclic stick which is connected through connector rod 22. A force exerted on yoke 16 by the force actuators will be transmitted through control rod 18 and be felt by the pilot through the cyclic stick connector 22. An override shown as 24 is provided in the control rod as is well known in similar control systems to permit the pilot to retain control of the helicopter even though a malfunction occurs which would lock the yoke 16 in a fixed position. The control rod 18 connects the cyclic stick to the helicopter control surfaces through a servo-actuated system.

A trim control 26 controllable by a thumbwheel 28 provides additional inputs to computation blocks 12 and 12'. The trim position inputs adjust the steady-state value of the force inputs provided by feel actuator 14 and 14' to yoke 16 depending on the trim position of the cyclic stick, and permit changes in the trim position by the pilot as desired Cyclic stick inputs initiated by the pilot through the cyclic stick 22 are fed to the proper control surface of the helicopter, such as the rotor blades, to generate an attitude change in the helicopter. The sensors 10 and 10' respond to the attitude change and produce a force in yoke 16 which is related to the load factor caused by the pilot induced attitude change. The pilot will feel this force as an opposing force in cyclic stick 22.

When the pilot moves the cyclic stick 22, the load factor on the helicopter induced by cyclic inputs can be separated from the load factor induced by the collective stick by measuring fuselage pitching rate $q$ and multiplying by airspeed $V$. That is, the cyclic load factor is proportional to $Vq$. The concept is similar to that of a mass whirling about on the end of a string of length $R$ at a rate $\chi$ which causes a tension in the string proportional to $R\chi^2$ (neglecting gravity). In the case of the helicopter, the tension is the load factor $N$, the rate of rotation $\chi=q$, and the velocity is $R\chi=V$. The load factor caused by pitch is $N \cong R\chi^2 = R\chi\chi = Vq$.

Collective inputs do not cause significant pitching rates, and the pitch rate approach avoids collective-to-pitch control coupling. Since a pitch rate gyro senses a body pitching rate in any turn, the load factor is sensed in any aircraft attitude. Equally important, the stick forces due to the signal $Vq$ yield excellent correlation with cockpit load factors induced by the pitch control during maneuvers. For example, at wings-level during a rolling reversal, there is no pitching rate, hence no stick force in the pitch rate approach.

Figure 2:
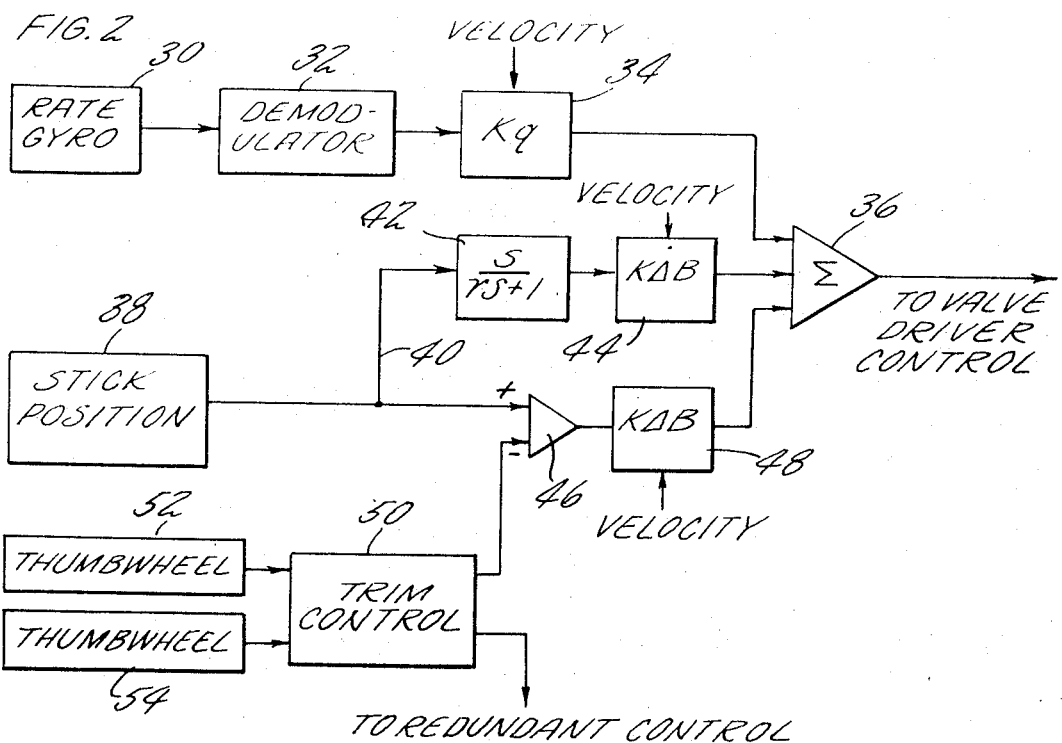
FIG. 2 is a schematic drawing in block diagram form showing the details of the electronics portion of FIG. 1.
Figure 2A:
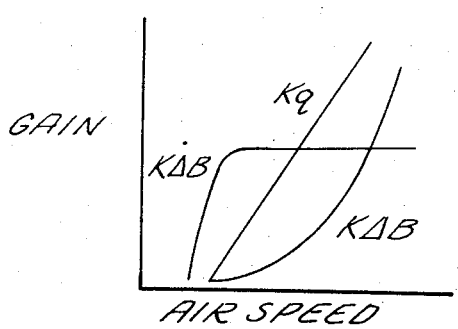
FIGS 2A and 2B show respectively the general form of the gain program and resultant force gradient produced in the pitch axis by the system of FIGS. 1 and 2.
Figure 2B:
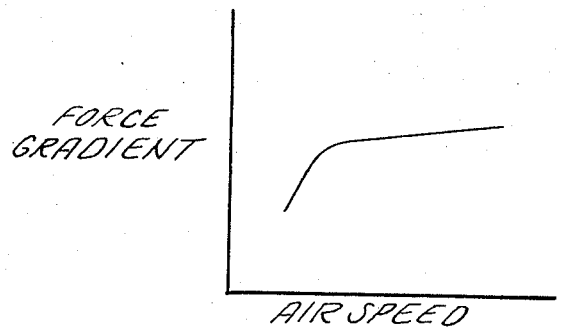

Details of the system shown in FIG. 1 are illustrated in FIG. 2. A rate gyro 30 senses the pitching rate of the helicopter and feeds its output signal through demodulator 32 to block 34 where a gain is applied to the pitch rate signal as a function of velocity. The gain schedule $Kq$ as a function of airspeed (velocity) is shown in FIG. 2A. The compensated pitch rate signal is then fed as an input to summing amplifier 36.

A signal indicative of the position of the cyclic stick is generated as shown in block 38. A potentiometer may be used for this purpose as is well known in the art. The stick position signal is then fed through line 40 to compensation block 42 where the cyclic stick position signal is both lagged and differentiated to produce a cyclic stick rate signal. This rate signal is then fed to block 44 where a gain is applied to the stick rate signal as a function of helicopter velocity. FIG. 2A shows the gain $K\Delta B$ as a function of velocity. After the proper gain is applied, the stick rate signal is also fed to summing network 36 as an input thereto.

The stick position signal from block 38 is also fed as an input to differencing circuit 46. Also fed as an input to block 46 is a signal indicative of the trim position of the cyclic stick. Comparator 46 compares the two signals and produces an output which is the difference between the two inputs and which is indicative of the cyclic stick deflection relative to its trim position. The difference signal is then fed to block 48 where a gain $K\Delta B$ is scheduled as a function of helicopter velocity, the schedule also being shown in FIG. 2A. The stick deflection signal with the proper gain applied thereto is then fed as a third input to summing network 36.

The trim position signal which is fed to comparator 46 is generated in trim control block 50 to be described in detail in conjunction with FIG. 9. Thumbwheels 52 and 54 to be described more fully in connection with FIGS. 4–8 provide inputs to trim control 50. Briefly, the trim control 50 generates a signal indicative of cyclic stick trim position, and the thumbwheels function to change the trim position.

The cyclic stick trim position signal from trim control 50 is also fed to a redundant control identical to the pitch rate, stick rate and stick deflection control shown in FIG. 2. That is, a duplicate control including a summing amplifier is utilized to provide a redundant system as shown in FIG. 1 where duplicate force actuators are illustrated. The relationship of the trim control to the two redundant systems comprising sensors and computations is also shown in connection with FIGS. 1 and 3.

The gain changes applied to the pitch rate, stick rate and stick deflection signals are required as the airspeed changes. The gain on pitching rate $Kq$ in block 34 is made proportional to airspeed in order to maintain the stick force to load factor ratio approximately constant. The gain on the stick deflection $K\Delta B$ in block 48 is increased with airspeed in order to improve hands off stick stability, and to provide a tighter reference for the stick trim function at high airspeeds. The gain on stick rate $K\Delta B$ is basically constant with airspeeds above 40 knots to encourage smooth pilot input and to accelerate shutdown if a failure occurs in the system. The gains to the inputs are scheduled as shown in FIG. 2A to produce a force gradient on the cyclic stick as a function of airspeed.

The redundancy of the sensors and computational components is desirable so that a fault detection criterion is provided. The feel augmentation system possesses both a high authority and a high rate capability, and the redundant components provide a comparison which would not be available if a single channel were used.

Shown in FIG. 3 are the details of the mechanical portion of the feel augmentation system together with the fault detection system. Summing network 36, shown in both FIGS. 2 and 3, produces a voltage output proportional to the sum of the compensated pitch rate, stick deflection and stick rate input signals. The output from summing network 36 is fed to a valve driver amplifier 60. Also shown in FIG. 3 is the redundant channel comprising summing network 36' and valve drive amplifier 60'.

The output from the valve driver amplifiers 60 and 60' is fed to pressure valves 62 and 62' which produce a differential pressure output to exert forces on rods 64 and 64' by actuating servomotor 66 and 66'.

Pressure valve 62 generates a fluid pressure which is fed via channels 68 and 70 to produce a pressure differential across piston 72 which exerts a force on rod 64. Inserted in the channels 68 and 70 respectively are solenoid valves 74 and 76 which are shown in their open position. As will be described, solenoid valves 74 and 76 may be rotated 90° by a valve actuator to close off channels 68 and 70 and to open channel 78 which will cause the pressure across piston 72 to equalize. This shutdown occurs in a very short time, for example 0.04 seconds. An orifice restrictor 80 is incorporated in channel 78 to provide a damping force to restrict piston motion caused by pilot inputs after actuation of shutdown valves 74 and 76.

Each servomotor or actuator 66 and 66' exerts one half of the stick force felt by the pilot which is transmitted through rods 64 and 64' to the ends of the yoke 16. The yoke 16 is pivoted at its center 81 on control rod 18. The yoke 16 transmits the sum of the forces generated through rods 64 and 64' to the pilot as felt in the cyclic stick through the control rod 18.

If the forces transmitted through rods 64 and 64' to the yoke 16 are mismatched sufficient to tilt the yoke 16 more than a predetermined amount, for example one degree, a fault detection system will initiate shutdown. To accomplish this, a synchro 82 is positioned on control rod 18 and connected to yoke 16 by means of arm 84. A duplicate synchro 82' may be positioned similarly to synchro 82 as shown in FIG. 3. When the yoke 16 pivots about control rod 18, an electrical signal is fed via line 86 to level detector 88, which produces an output signal if the yoke tilts more than a predetermined amount. The output signal is fed to the OR circuit 90. The output from the level detector 88 will indicate that a fault has occurred, and OR circuit 90 will produce a signal which is fed to latch circuit 92.

Valve actuator 94 is connected to solenoid valves 74 and 76 via connectors 96, and normally maintains the valves in the open position as shown in FIG. 3. Upon the occurrence of a fault, latch circuit 92 transmits a signal to valve actuator 94 which causes the solenoid valves 74 and 76 to be rotated 90°, closing channels 68 and 70 thereby equalizing pressure across piston 72 and removing all forces from control rod 64 except damping forces in reaction to pilot inputs.

Synchro 82' also transmits a signal to a level detector 88', similar to detector 88, which also feeds a signal to the OR circuit 90 if the yoke tilts more than a predetermined amount. When any failure signal from a level detector causes an output from the OR circuit, both valve actuators are operated causing a complete shutdown of the feel augmentation system.

A reset button 98 is attached to latch circuit 92, the reset preferably being positioned in the pilot's compartment. Actuation of the reset will cause the valves 74 and 76 to return to their initial position, opening channels 68 and 70 to reinstate the force on yoke 16 caused by piston 72 acting through rod 64. This reset will not occur, however, when any failure signal is present.

While not detailed in FIG. 3, the OR circuit 90 and latch circuit 92 are designed redundantly so that failure of any component in this circuitry will not incapacitate the shutdown capability. Also, the OR circuit, the latch circuit, the valve actuators and the solenoid valves revert to the shutdown mode in the event of any power failure.

A detent mechanism shown generally at 100 absorbs small force differences in order to avoid failures caused by a slight mismatch in forces which would otherwise cause rotation of yoke 16. As illustrated, a control rod 102 is pivotally connected to the end of yoke 16. The rod 102 has a detent 104 therein. A pivotable member 106 is connected to the bottom portion of extension 108 of control rod 18. Inserted into member 106 are two ball members 110 which are set in the detents 104 by means of a spring 112 held in place by a thumbscrew 114 adjustable to vary the spring tension. The detent mechanism 100 will prevent movement of yoke 16 by a slight force unbalance until the tension produced by springs 112 on the ball members 110 is overcome, at which time yoke 16 will rotate because of the force unbalance and cause synchros 82 and 82' to provide a fault signal to level detectors 88 and 88'. FIG. 3A shows graphically the yoke angular acceleration a as a function of the difference in forces $F_1-F_2$ which act through rods 64 and 64'. Until the difference in the forces exceeds a predetermined value fixed by the force of springs 112, the ball members 110 will remain within the detents 104. Once the predetermined value has been exceeded, the unbalanced force on rod 102 will overcome the spring forces and will allow yoke 16 to rotate.

Shutdown of the system may be caused by other failures than a force unbalance applied to yoke 16. For example, a comparator 120 measures the difference in voltages between the outputs of summing networks 36 and 36'. When the difference exceeds a predetermined amount, a signal is fed via line 122 to level detector 124, and an output from the level detector is fed to the OR gate 90 causing the servomechanisms 66 and 66' to be deactivated.

The output from comparator 120 may also be fed to a limiting network 126 which produces an additional input signal to summing network 36'. This signal will compensate for any unbalance at the inputs to summing networks 36 and 36' by adding a small input signal to the summing network 36'. Limiting network 126 limits the input to summing network 36' to an amount sufficient only to compensate for a small unbalance. Any unbalance or voltage difference between the outputs of the summing networks greater than a predetermined amount will deactivate the system as previously described.

The current outputs from the valve driver amplifier 60 and 60' are compared in comparator network 128, and any difference therebetween above a preselected value will cause level detector 130 to actuate OR gate 90 and also cause the system to be deactivated.

The force exerted by the servomechanisms 66 and 66' on yoke 16 are transmitted through control rod 18 to the cyclic stick grip. These forces are then related to the load factor caused by pitch inputs to the helicopter through actuation of the cyclic stick. By virtue of the novel system shown herein, the ratio of the forces exerted on the cyclic stick to the induced load factor is held constant as airspeed changes, and thus the pilot is provided with a desirable sensory input that does not change with airspeed.

The trim control and thumbwheel system shown in FIGS. 1 and 2 is described in more detail in connection with FIGS. 4-9. The function of trim control and thumbwheel need not be limited to the feel augmentation system as described herein, but may be utilized with great advantage in any other system in which a variable output independently controlled from two remote locations is desired.

The basic system is shown in FIG. 9. Two thumbwheels, 140 and 142, are shown. These thumbwheels may be positioned respectively in the cyclic stick grip at the pilot and copilot's station in a helicopter. The thumbwheels in the present embodiment will provide pitch trim signals independently from the pilot and copilot, but allow each to maintain complete control of the trim position of the cyclic stick.

A signal from thumbwheel 140 is fed to stepping motor 144 to rotate the stepping motor either forward or backward. The details of the thumbwheel and the means for generating an output signal therefrom will be described in conjunction with FIGS. 4-8. The output shaft from the stepping motor 144 is connected through gear assembly 146 and drive shaft 147 to the wiper arm 148 of potentiometer 150.

The signal from thumbwheel 142 causes rotation of stepping motor 152 whose output shaft is connected through gear assembly 154 and drive shaft 155 to the case 156 of potentiometer 150.

The gear ratio must be sufficiently high to ensure that the pilot-controlled stepping motor will not drive the copilot-controlled stepping motor through the potentiometer.

The output voltage from the potentiometer 150 is fed from the slip rings 158 connected to the potentiometer to the differencing circuit 46 as shown in FIG. 2.

By virtue of controlling the rotation of the wiper arm of the potentiometer from thumbwheel 140 and controlling the rotation of the potentiometer case from thumbwheel 142, the output voltage from the potentiometer 150 may be continuously controlled by the rotation of either of the thumbwheels. In other words, regardless of the position of the potentiometer case as determined by thumbwheel 142, thumbwheel 140 can control the wiper arm of the potentiometer to produce the full range of output voltages from the potentiometer. Likewise, regardless of the position of thumbwheel 140 and the position of the wiper arm 148, thumbwheel 142 can cause rotation of the potentiometer case 156 to thereby produce the full range of output voltages from the potentiometer.

The potentiometer incorporates mechanical stops to prevent relative rotation of the case and wiper part, the positions of the stops corresponding to the end limits of the desired output voltage signal. These end stops resist further rotation of a stepping motor even though the thumbwheel may continue to demand further rotation. If the rotation of the thumbwheel is reversed, however, the potentiometer will immediately begin to respond.

Referring to FIG. 4, the thumbwheel comprises a stationary armature consisting of elements 160 and 161. Encased therein is a rotatable portion consisting of a circular ribbed or knurled outer portion 162 and an inner element 163. A mounting hole 164 extends through the center of the stationary armature element 161.

Encased within the stationary armature is an electrically conductive segment shown in FIG. 4 at 166. An input brush 168 of conductive material such as carbon is positioned so as to make electrical contact with segment 166. A power supply such as battery 170 produces a voltage at input brush 168.

FIG. 6 shows the details of the input side of the thumbwheel with the stationary armature element 160 removed. A plurality of conductive segments A, B, C and D are shown. Each segment is separated from each adjacent segment by insulating material 172. Segment 166, shown in FIGS. 4 and 6, is an A segment and is in contact with slip ring 174 shown in FIGS. 4 and 5. An output brush 176 contacts slip ring 174 and conducts the electrical voltage from battery 170 to the stepping motor. A complete circuit from battery 170 through input brush 168, segment 166, slip ring 174 and output brush 176 occurs when the rotatable portion of the thumbwheel is positioned with one of the A segments in contact with the input brush. The construction of the A segments is shown in FIG. 7.

The B segments are all in contact with slip ring 178 and output brush 180. Segments C as shown in FIG. 8 are shaped so as to be in contact with slip ring 182, and segments D are in contact with slip ring 184. Thus, when the rotatable portion of the thumbwheel comprising member 162 and 163 and the segments A, B, C and D are rotated, the battery voltage will pass through the input brush and through whichever segment is in contact with the input brush, through the corresponding slip ring, and through the output brush to the stepping motor.

Each of the four output brushes is connected to a winding of stepping motor 144. The windings may be separated by 90°. If the thumbwheel is moved from any segment A to any segment B, for example, the stepping motor will rotate 90° in one direction. If the thumbwheel is moved from any segment A to any segment D, the stepping motor will rotate in the opposite direction 90°. As is known to those skilled in the art, the input brush may be constructed such that it will contact two segments, such as A and B, simultaneously. In this case, two windings will be energized and the stepping motor will rotate at 45° intervals rather than 90° intervals. Any number of segments, with corresponding slip rings and output brushes, may be used.

A desirable result of the thumbwheel trim system as shown in FIGS. 4-9 is that complete failure of one thumbwheel connection does not cause the system to become inoperative, since the trim control may be operated by either thumbwheel.

Rotation of either thumbwheel in FIG. 9 will vary the output voltage from potentiometer 150 which is then fed, as seen in FIG. 2, to differencing circuit 46. The output from circuit 46 is a stick displacement signal. This signal is fed through summing network 36 to the feel actuating system to increase or reduce the force applied to the cyclic stick. This signal will be present whether or not a maneuver is occurring, and hence may be utilized by the pilot or copilot to retrim the cyclic stick. The thumbwheel may be rotated at whatever rate is desired and may therefore be utilized as a fine adjustment to the cyclic stick. The cyclic stick will physically move in response to any force generated by the feel actuators if its movement is not opposed by the pilot. Consequently, if the pilot is executing a maneuver which would require the cyclic stick to remain in a new position for an extended period of time, the thumbwheel trim control may be used to readjust the trim position of the stick and eliminate all forces acting on the stick.

Although the present feel augmentation control has been described in relation to the pitch axis, an identical system may be utilized for roll control. A roll rate gyro will be substituted for the pitch rate gyro. Roll control feel augmentation requirements are considerably less stringent than for pitch control, since roll aerodynamic response remains fairly constant for all airspeeds.

Roll stick deflection, roll stick rate and fuselage roll rate are the preferred signals to provide roll feel augmentation. A constant input force to aircraft roll rate ratio, at force levels in harmony with pitch control forces, will provide desired feel augmentation in the roll control. To implement roll control, grip mounted thumbwheels that control the stick trim position in roll may be incorporated. Both pitch and roll augmentation may also be used simultaneously. For this implementation, two thumbwheels will be incorporated on each cyclic stick grip, one for the pitch channel and one for the roll channel.

The present feel augmentation system thereby provides for the pilot a sensory input which provides a reference for maneuvers which he has commanded. The forces which oppose the cyclic stick movement, either in roll or pitch, will always be constant for the same maneuver, that is, for a maneuver which causes the same load factor on the helicopter. Although the stick deflection required to execute the same maneuver will change as a function of airspeed, the forces felt by the pilot's hand will not change. High speed handling of the helicopter is considerably improved by the present feel augmentation system.

It is obvious that the forces applied to the cyclic stick need not be linearly related to load, but may vary as any desired function. For example, it may be desirable to increase the forces that the pilot feels in an exponential or other non-linear manner with increasing load to thereby provide a more positive sensory input to the pilot that loading is being increased. Variations in the gain profiles applied to the system input signals may be used to produce the desired relationship.

Although the present invention has been disclosed in its preferred embodiment, it will be apparent to those skilled in the art that changes may be made to the details and the arrangement of parts without departing from the scope of the invention as hereinafter claimed.

We claim:

1. In an attitude control system for a helicopter having a cyclic stick, and in which deflection of said cyclic stick causes an attitude change in said helicopter about the pitch or roll axis thereof, a feel augmentation control apparatus comprising, means for generating a first signal indicative of rate of attitude change of said helicopter about one of said axis in response to deflection of said cyclic stick, means for generating a second signal indicative of the amount of deflection of said cyclic stick from its trim position, means for generating a third signal indicative of rate of deflection of said cyclic stick, means for applying a variable gain to each of said first, second and third signals as a function of the airspeed of said helicopter, means for summing said first, second and third signals to produce a control signal, and means responsive to said control signal for generating a force on said cyclic stick in a direction to oppose the deflection thereof, said force having a magnitude which is in direct proportion to the load induced on said helicopter as a result of the deflection of said cyclic stick.

2. An attitude control system as in claim 1 in which said force generating means includes a control rod connected to said cyclic stick and a servomechanism responsive to the magnitude of said control signal for applying a force to said control rod in proportion thereto.

3. An attitude control as in claim 1 in which said means for generating said first signal includes a rate gyro responsive to rate of rotation of said helicopter about said axis.

4. An attitude control system as in claim 1 further including means for generating a signal indicative of stick position,
means for differentiating said stick position signal with respect to time to produce said third signal,
means for generating a signal indicative of stick trim position,
and means for comparing said stick trim position signal with said stick position signal to produce said second signal.

5. An attitude control system as in claim 4 and including thumbwheel means connected with said cyclic stick, rotation of said thumbwheel means producing a change in the trim position of said cyclic stick and varying said stick trim position signal.

6. In an attitude control system for a helicopter having a cyclic stick, and in which deflection of said cyclic stick causes an attitude change in said helicopter about the pitch or roll axis thereof, a feel augmentation control apparatus comprising,
means for generating a first signal indicative of rate of attitude change of said helicopter about one of said axes in response to deflection of said cyclic stick,
means for generating a second signal indicative of the amount of deflection of said cyclic stick from its trim position,
means for generating a third signal indicative of rate of deflection of said cyclic stick,
means for applying a variable gain to each of said first, second and third signals as a function of the airspeed of said helicopter,
means for summing said first, second and third signals to produce a control signal,
means for generating a second control signal identical with said first control signal,
a control rod connected to said cyclic stick whereby a force applied to said control rod will be transmitted to said cyclic stick,
and first and second force actuating means responsive respectively to said first and second control signals for generating a force on said control rod to oppose the deflection of said cyclic stick, the force transmitted by each of said first and second force actuating means being equal and being of a magnitude which is in direct proportion to the load induced on said helicopter as a result of the deflection of said cyclic stick.

7. In an attitude control system for a helicopter having a cyclic stick, and in which deflection of said cyclic stick causes an attitude change in said helicopter about the pitch or roll axis thereof, a feel augmentation control apparatus comprising,
means for generating a first signal indicative of rate of attitude change of said helicopter about one of said axes in response to deflection of said cyclic stick,
means for generating a second signal indicative of the amount of deflection of said cyclic stick from its trim position,
means for generating a third signal indicative of rate of deflection of said cyclic stick,
means for applying a variable gain to each of said first, second and third signals as a function of the airspeed of said helicopter,
means for summing said first, second and third signals to produce a control signal,
means for generating a second control signal identical with said first control signal,
a control rod connected to said cyclic stick whereby a force applied to said control rod will be transmitted to said cyclic stick,
a yoke member pivotally connected to said control rod and extending at substantially right angles thereto,
first and second actuator members pivotally connected to the ends of said yoke member at opposite ends thereof,
and first and second servo means responsive respectively to said first and second control signals for generating a force on each of said actuator members in a direction to oppose the deflection of said cyclic stick said force having a magnitude which is in direct proportion to the load induced on said helicopter as a result of the deflection of said cyclic stick.

* * * * *